Oct. 8, 1963     T. M. TURNER     3,106,500

WOOD VENEERED GYPSUM BOARD PANEL AND PROCESS FOR MAKING SAME

Filed Nov. 1, 1960

*INVENTOR.*
THOMAS M. TURNER

BY *Hall & Houghton*

ATTORNEY

United States Patent Office 3,106,500
Patented Oct. 8, 1963

3,106,500
WOOD VENEERED GYPSUM BOARD PANEL AND PROCESS FOR MAKING SAME
Thomas M. Turner, 6094 Scarlet Drive, Cincinnati 24, Ohio
Filed Nov. 1, 1960, Ser. No. 66,557
17 Claims. (Cl. 156—91)

The present invention relates to wood-veneered panels using a gypsum board as a base, and has particular reference to a process for making a wood-veneered panel having a gypsum board as the base material.

A principal object of the invention is to produce a substantially fireproof or otherwise highly fire resistant wood-veneered panel of simple and economical construction, wherein only one face of a paper-enclosed gypsum board is substantially covered by a wood veneer.

Basically, the present invention provides a novel and improved wood-veneered gypsum board panel wherein one face of a gypsum board has a lamination of wood veneer over the surface thereof, but provides a free marginal area of small dimension around the peripheral edges of the gypsum board panel. When two gypsum boards are assembled to form a portion of a wall, a molding strip is used to extend over the free marginal areas along the peripheral edges of the gypsum board to form an attractive covering for the joint, while concealing nails or other mounting devices. The molding strip may be flat or it may be angular in cross-section so that it covers the marginal areas where gypsum board panels are used to form a corner of a wall.

For many years, the wall paneling manufacturing industry has been concerned and striving to develop a fireproof or highly fire resistant panel which incorporates the warmth and beauty of natural woods, while at the same time, maintaining the costs in a competitive relation with all-wood combustible plywood panels. It is known that wood veneers have been applied to many types of bases, many of which have proved to be completely unsatisfactory. For example, the chip boards, hard boards, bagasse, and various composition bases have not provided the desired incombustibility. Metal bases are known to be expensive, difficult to work with in forming walls and the like, and also are highly transmissive of heat. Asbestos bases have proved to be expensive and difficult to install as wall board panels. Plasterboard and gypsum base boards have generally been proved to be difficult to process without damaging the delicate base of the material and have been deemed unsatisfactory because of the fragile, exposed edges of the board panel. The lack of commercial success of veneered plasterboards and gypsum-type boards has been effectively related in part to the difficut properties of the board that are apparent in the presence of these fragile, exposed edges.

In the general construction of many veneered panels, the veneer has been applied to both sides of the base material. A wood veneer has a strong tendency to warp the panel to which it is applied even where the veneer is very thin. The tendency to warp the panel is sometimes overcome by applying a second veneer to the other side of the panel, having its grain generally perpendicular to the first veneer. Many efforts have been made to obviate the necessity for these second or balancing veneers, such as by a process whereby a very thin veneer is glued to one side only of the base material, using a flexible glue and a cold press to produce a flat non-warped panel. While this process may be ingenious, it is expensive, tedious, time-consuming in performance thereof, and is not completely warp-proof under the conditions and standards of the present day. Additionally, the thin veneer is expensive and quite delicate to process, including applying thereto a wet glue which may also have deleterious effects upon the gypsum board base. These disadvantages as well as the extended long "lay-up" time requiring extra floor space and time to perform the process, all contribute to make such a process unfeasible and uneconomical.

The present invention overcomes many of these problems by new and improved construction and steps of the process having advantages which will become apparent from a detailed description of the invention and from the appended drawings and claims. In the description, reference is made to the accompanying drawings of which:

Referring now to the figures, there is illustrated a gypsum board base material or plasterboard base panel 10 which is constructed of generally hydrated salt calcium sulfate ($CaSO_4 \cdot 2H_2O$), in which the material is bound by a paper on both sides thereof as well as along the edges of the long dimension. The panel is of uniform thickness and weight as required for the particular purposes for which the panel is to be used. These types of plasterboard panels are commercially available under the known trade names of Sheet Rock, Gold Bond, as well as others, and are made in uniform thicknesses of a range between $1/4''$ through $3/4''$. The base material may vary in composition with additives to provide additional strength and fire resistance characteristics as well as variations in style, type, color and treatment of the paper surfaces.

Onto the face of the base panel 10 there is applied a facing of wood veneer 12 which may be of a uniform thickness, for example, $1/28''$. This type of wood veneer is available commercially for the manufacturing of furniture and other panelling constructions and productions. In the process hereinafter described, the use of thinner or thicker wood veneers is permissible.

Figure 2:
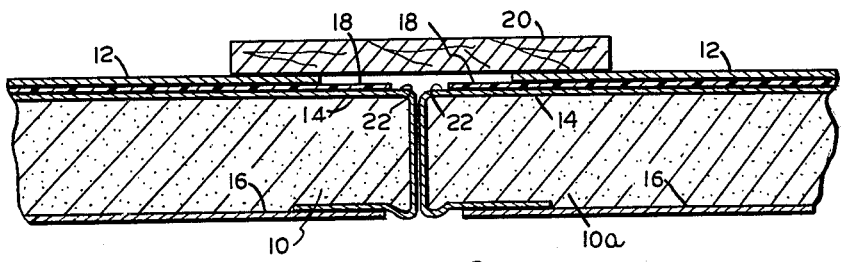
FIGURE 2 is a plan view of adjacent edges of a portion of two wood-veneered panels showing the joint covered by a molding strip connecting the wood veneer portions of the respective panels in accordancse with the present invention.

As shown in greater detail in FIGURE 2, there is shown a front paper covering 14 as generally provided on commercial gypsum board in which the edges thereof extend to cover the lateral edges of the panels and are folded to be received under a back paper covering 16. These paper coverings may be the same or they may be different from one another, but both paper coverings are designed so as to effect a bond between the paper coverings and the base gypsum material. As the $CaSO_4 \cdot 2H_2O$ sets, there are formed crystals which adhere to the paper fibrils. The facing of wood veneer 12 is applied to the front paper covering 14 by an adhesive 18 which is used in the lamination of the wood veneer 12 onto the panel. The adhesive is a thermo-setting resin of the dry film type, e.g., dry film phenol-aldehyde or urea-aldehyde resins, or alkyd resins of the thermosetting type, examples of which are described in Degering, "Organic Chemistry," Barnes & Noble, Inc., New York, 6th edition, 1953, pages 270–273.

As further illustrated in FIGURE 2, two of these panels are placed in an end-to-end relation and form a wall. A molding strip 20 is used to cover the joint of the veneered gypsum board panels 10, 10a. The molding may take any of many forms, such as half-rounds, grooved strips, angle elements, and other types, but one of the satisfactory and preferred arrangements is the provision of a 1½" wide strip of ⅛" or ¼" wood, having a facing of the same general specie as that of the base panel 10.

In the successful processing of the product according to the invention, it is essential that the time and temperature be accurately controlled during hot plate pressing while using a dry film thermosetting adhesive.

Gypsum board panels are readily available and can be cut to size and may have provided thereon a tapered portion along the paper bound edges thereof which is provided to allow for the concealment of joints by taping and cementing (not shown). Gypsum board is also manufactured and available with a square or non-tapered edge. In applying the present invention, either form may be readily used for the manufacture of the improved wood-veneered gypsum board panels, but in the tapered edge type of panel, shims are recommended to fill in the tapered portion while the panel is undergoing a hot plate pressing operation.

The dry film adhesive 18 may be a thin sheet of paper saturated with a thermosetting resin which is cut to size of the panels 10, 10a. The size may be approximately the size of the gypsum board panel.

The wood veneer which is to be applied to the panel is cut to size after it has been joined, spliced by a preferred tapeless method, and properly dried to the proper moisture content before joining. The size of the wood veneer 12 is approximately the size of the gypsum board panel 10, and is preferably a slight amount smaller than the size of the panel so that a small free marginal area 22 extends around the peripheral portions of the panel between the veneer and the edge of the panel. In this way there is avoided the necessity of trimming the veneer or the base. This is found to be particularly important, as the trimming of the base would break and destroy the enclosing paper covering that extends from the front to the back along the lateral edges of the panel and thereby potentially weaken the panel.

Figure 3:
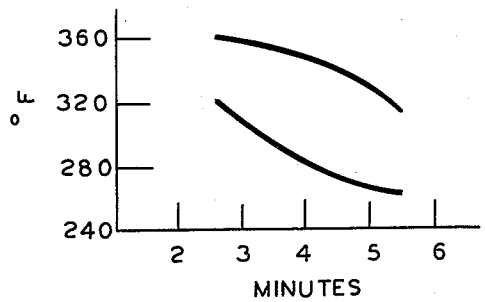
FIGURE 3 is a time-temperature chart illustrating the process of making the improved wood-veneered gypsum board panel in accordance with the process of the present invention.

The dry film adhesive is placed between the gypsum base panel and the wood veneer 12. These components may be held in their proper relative position by a stapling or taping operation that secures their relative position thereby, which stapling and taping are illustrated at 23 and 24 respectively, in FIG. 1. These components are then placed into a common "daylight" press for providing rapid curing of the glue with minimum damage to the gypsum board. The assembled components may be subjected to a uniform pressure of between 50 p.s.i.g. and 300 p.s.i.g. The optimum value is found to be approximate to 150 p.s.i.g. In a preferred arrangement and process, two of these component arrangements may be placed in back-to-back arrangement so that the panel is on the inside of the arrangement and the veneer is turned to the heated platens or cauls. This provides for substantially rapid curing of the adhesive and forming the veneer onto the panel with minimum damage to the gypsum board. FIGURE 3 shows a plot of temperature versus time in which a wide practical range of operation for a dry film phenolic resin is used as the adhesive. It is currently preferred to operate the wood-veneered gypsum board panel forming process in the lower ranges of time and temperature, e.g., three minutes and 310 degrees F. This time is relatively short for high capacities and provides a good cure of the adhesives 18. The gypsum material is not overheated nor is the veneer overdried. Satisfactory products may still be obtained if small deviations of control from these conditions are allowed. Conditions below the lower values shown by the curve result in a poor cure of the adhesive and conditions above the upper limits of the curve result in damage to the gypsum board, such as a rupture of the bond between the encompassing paper and the calcium sulfate.

After removal of the composite panels from the press and heating operation, no trimming of the edges is required. The panel may then be directly subjected to operation of sanding accomplished in the usual plywood fashions. From the sanding operations, the panel may be subjected to a finishing operation, after which the composite panel and veneer board is packaged for shipping as required.

In the manufacture of two-ply laminates, warpage is always considered a hazard. This is well known and is due to the expansion and contraction that is readily performed in the wood upon the addition or loss of moisture therein. Wood veneer is commonly available in thicknesses approximating $\frac{1}{28}$" in thickness having an equilibrium moisture of approximately 6% to 10% under normal conditions encountered in houses and offices. This moisture content varies depending upon conditions to which the veneer may be exposed and the physical dimensions of the veneer unfortunately change with its moisture content. Moisture control before and during the manufacturing process of the invention is required and is relatively simply accomplished in that the equilibrium moistures are those that are eventually desired. The application of a good penetrating finish after the lamination step concludes all concern with swelling or shrinking under normal conditions.

With cold press operation of the prior art, there is a presence of surplus water due to the presence and use of a wet glue, and eventual warpage is difficult to control. In such case, the final set of the glue is to a veneer with moisture substantially and normally higher than the values of equilibrium moisture given above. This tends to result in a panel that is concave on the veneer side, caused by subsequent drying and shrinking of the veneer after the cold press operation.

In hot press operation, the problem is alleviated somewhat by a faster set of the adhesive and the drying action of the press, but it cannot be completely solved short of eliminating the excess moisture in the glue. The present invention applies the principles of dry film adhesion and hot pressing of a panel combination to obviate the above disadvantages.

Figure 1:
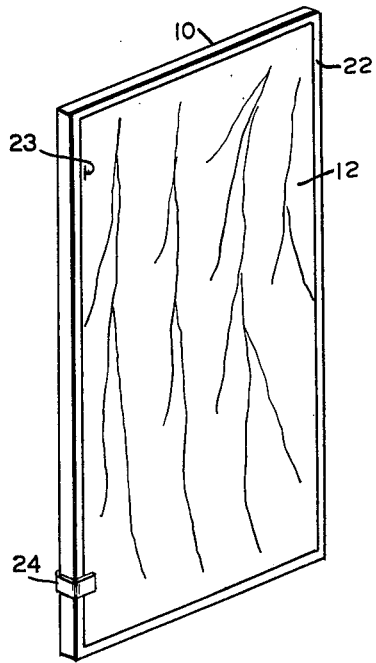
FIGURE 1 is a perspective view of a wood-veneered gypsum board panel, in accordance with the preferred embodiments of the present invention.
Figure 5:
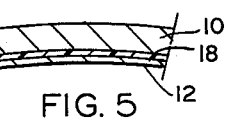
FIGS. 4 and 5 are cross-sectional details of convex and concave panels produced in accordance with the invention.
Figure 4:
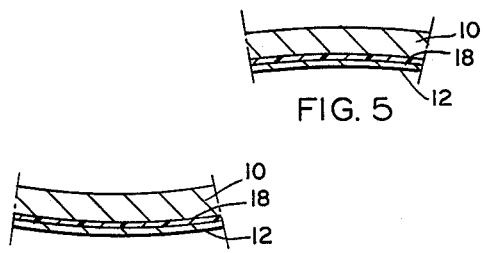

With the dry film resin and a controlled hot press operation, control of warpage can be achieved by the simple expedient of controlling the veneer moisture content. By using a veneer somewhat drier than room equilibrium, it is possible to achieve a convex panel (FIG. 4), and by using a wet veneer, a concave panel (FIG. 5). By using a veneer having an equilibruim moisture content, such as 8%, an essentially true and flat panel results (FIG. 1).

It is known that gypsum is subject to calcining by the continued application of heat above 212 degrees F. This does not harm the wall board material if kept within limits, because the change in physical dimensions is substantially negligible. Care must be observed in eliminating the excessive application of the heat so that any bond between the gypsum and the enclosing paper covering is not broken by escaping moisture and vapors.

Gypsum board can also be damaged where a wet glue is used in either the cold or hot press methods. In a hot press operation using 35% moisture urea resin glue, severe steam blistering under the veneer and paper covering was encountered. The excess water in the glue or the liberation of water from the gypsum $CaSO_4 \cdot 2H_2O$ might have been the cause of the blistering. With the dry film glue method of the invention, no steam blistering has been encountered, although efforts were made to create this condition within the limits of the control values as set forth in FIGURE 3. This would tend to indicate that the excessive water in the glue has been the main cause of steam blistering. Further, a trial cold press operation with wet glue has resulted in a softening and failure under pressure of the fragile bond between paper and gypsum.

A slight veneer side concavity may prove to be an asset in the installation of plaster board base panels and thereby obviating the necessity for nailing the panels other than on the edges thereof. This slight veneer side concavity, if pronounced however, could result in face-checking and other disadvantages. Cracks in the veneer will occur only if the veneer is substantially above equilibrium moisture when the final set of the adhesive is achieved. In wet glue operations, this is a substantial hazard. In hot press methods, dry film adhesive operations easily control the condition of moisture by limiting the veneer moisture to equilibrium values or slightly below.

Thus, it is seen that a new and improved veneered panel board and the method of making the same, have the new advantage of being formed without addition of moisture to the veneer which is avoided by the use of dry film adhesive. Also, there is prevented any potential damage to the delicate gypsum board by avoiding excessive moisture and heat. The new panel utilizes a commercially available glysum board with no requirement to trim the edges of the panels, and thereby avoiding raw edges of the gypsum board. The panel is resistant to fire, vermin and dimensional changes.

Preferred embodiments of the invention have been described. Various changes and modifications however may be made within the scope of the invention as set forth in the appended claims.

What is claimed is:

1. A wood-veneered panel comprising a gypsum board having a substantially flat surface of a predetermined size and dimensions including a paper covering extending over the front and rear surfaces of the board and covering the lateral edges of the board, a wood veneer of slightly smaller dimensions than the corresponding flat surface dimensions of the board and a thermosetting dry film adhesive applied to only one flat surface of said board to which the wood veneer is applied with its lateral edges in inwardly spaced relation to the lateral edges of the board.

2. The invention according to claim 1 wherein said film adhesive is in the form of a thin sheet of paper saturated with said thermosetting dry resin.

3. The invention according to claim 1 wherein the wood veneer has a moisture content at normal conditions to provide an essentially true and flat panel.

4. The invention according to claim 1 wherein the wood veneer has a moisture content below normal equilibrium conditions to provide an essentially convex panel.

5. The invention according to claim 1 wherein the wood veneer has a moisture content above normal equilibrium conditions to provide an essentially concave panel.

6. The invention according to claim 1 wherein the edges of the wood veneer lie in inwardly spaced relation to all edges of said gypsum board.

7. A process of making a veneered board comprising the steps of assembling in flat relation a gypsum board having a thin paper sheet impreganted with a thermosetting dry resin film adhesive applied to only one surface thereof, cutting a sheet of wood veneer to a width slightly smaller than the surface width of said gypsum board, placing the sheet of wood veneer over the thin sheet of paper adhesive so that the sheet of paper adhesive is between the wood veneer and the gypsum board and so that the lateral edges of said veneer are inwardly spaced from the lateral edges of said board, and curing the assembled components under heat and pressure.

8. The process of claim 7 wherein the curing is effected at a temperature of between 250 degrees F. and 360 degrees F. applied for a period of between two to seven minutes whereby dehydration of the gypsum is minimized.

9. The process of making a veneered board according to claim 7 wherein two of said assembled components are arranged in back-to-back relation so that the gypsum board is on the inside of the multiple arrangement and the veneer is turned to the heated elements in said curing step.

10. The process of making a veneered board according to claim 7 wherein the curing step subjects the assembled components to a pressure between 50 p.s.i.g. and 300 p.s.i.g.

11. The process of making a veneered board comprising the steps of assembling in flat relation a gypsum board having one surface to which is applied a thin sheet of thermosetting dry resin film adhesive, cutting a sheet of wood veneer to a size slightly smaller than the surface size of said gypsum board, placing the sheet of wood veneer over the thin sheet of adhesive so that the sheet of adhesive is between the wood veneer and the gypsum board and so that the veneer is centered in spaced relation to the peripheral edges of the gypsum board, and curing the assembled components under heat and pressure.

12. The invention according to claim 11 wherein the curing step is for three minutes at 310 degrees F.

13. The invention according to claim 11 wherein the moisture content of the wood veneer is at normal conditions.

14. The invention according to claim 11 wherein the moisture content of the wood veneer is below normal conditions to produce a convex panel.

15. The invention according to claim 11 wherein the moisture content of the wood veneer is above normal conditions to produce thereby a concave panel.

16. The invention according to claim 11 wherein a penetrating finish is applied to the cured assembled components to maintain at a substantially constant value the moisture content thereof.

17. The invention according to claim 11 wherein there is applied a staple to secure the assembled components in their assembled relation.

References Cited in the file of this patent

UNITED STATES PATENTS

| | | |
|---|---|---|
| 1,369,743 | Hood et al. | Feb. 22, 1921 |
| 1,875,888 | Richardson | Sept. 6, 1932 |
| 1,891,430 | Loetscher | Dec. 20, 1932 |
| 1,978,807 | Merritt | Oct. 30, 1934 |
| 1,999,253 | Norris | Apr. 30, 1935 |
| 2,054,246 | Dalzell | Sept. 15, 1936 |
| 2,239,860 | Roos | Apr. 29, 1941 |
| 2,253,667 | Warner | Aug. 26, 1941 |
| 2,261,264 | Luty | Nov. 4, 1941 |
| 2,459,851 | Story | Jan. 25, 1949 |
| 2,699,416 | Lyijynen et al. | Jan. 11, 1955 |

FOREIGN PATENTS

| | | |
|---|---|---|
| 462,829 | Great Britain | Mar. 16, 1937 |